United States Patent [19]
Nakamura

[11] Patent Number: 5,975,000
[45] Date of Patent: Nov. 2, 1999

[54] RUBBERY MARINE FENDERS

[75] Inventor: Masahiro Nakamura, Yokohama, Japan

[73] Assignee: Bridgestone Corporation, Tokyo, Japan

[21] Appl. No.: 08/872,172

[22] Filed: Jun. 10, 1997

[30] Foreign Application Priority Data

Jun. 13, 1996 [JP] Japan ..................................... 8-174145

[51] Int. Cl.$^6$ ..................................................... B63B 59/02
[52] U.S. Cl. ........................................... 114/219; 405/215
[58] Field of Search ........................... 114/219; 405/215; 267/140

[56] References Cited

U.S. PATENT DOCUMENTS

| | | | |
|---|---|---|---|
| 3,779,536 | 12/1973 | Lachmann | 267/140 |
| 5,458,077 | 10/1995 | Enami et al. | 114/219 |

FOREIGN PATENT DOCUMENTS

| | | |
|---|---|---|
| 60 055111 | 3/1985 | European Pat. Off. . |
| 135 997 | 4/1985 | European Pat. Off. . |
| 622 495 | 11/1994 | European Pat. Off. . |
| 2 320 391 | 3/1977 | France . |
| 58-168706 | 10/1983 | Japan . |
| 60-55111 | 3/1985 | Japan . |
| 1 266 106 | 3/1972 | United Kingdom . |
| WO 97/01479 | 1/1997 | WIPO . |

*Primary Examiner*—Sherman Basinger
*Attorney, Agent, or Firm*—Sughrue, Mion, Zinn, Macpeak & Seas, PLLC

[57] ABSTRACT

A rubbery marine fender comprises a main rubber body portion, a shock receiving rubber portion and a securing rubber flange portion, in which a rubber buildup portion protruding outward from the outer surface of the main rubber body portion is arranged on the outer surface of the main rubber body portion at either or both regions adjacent or close to a buckling peripheral line thereof.

6 Claims, 4 Drawing Sheets

FIG_1
PRIOR ART
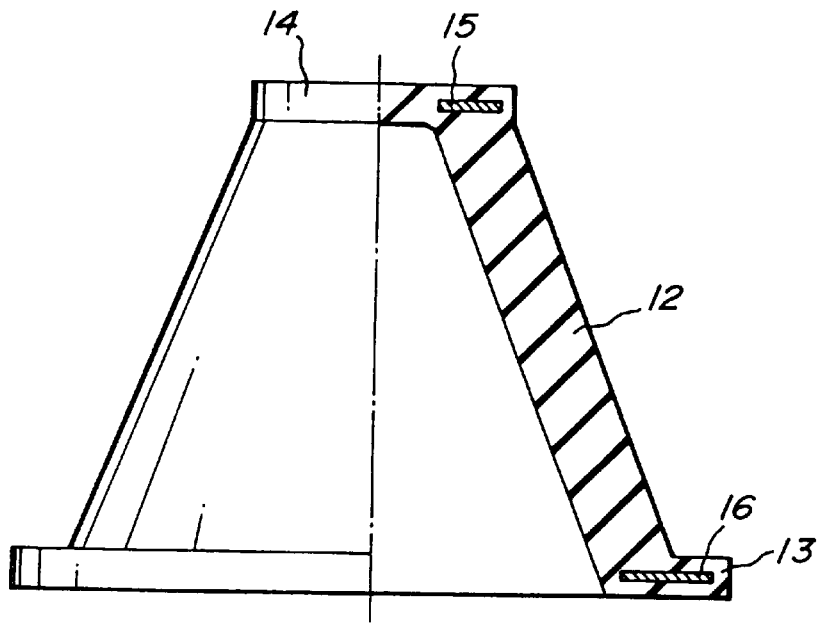
FIG_2
PRIOR ART
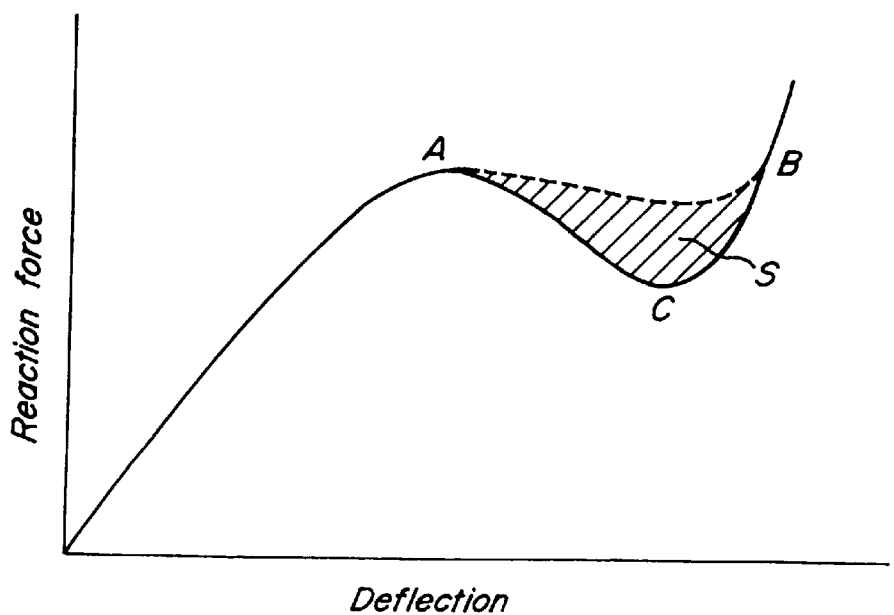

FIG_3
PRIOR ART
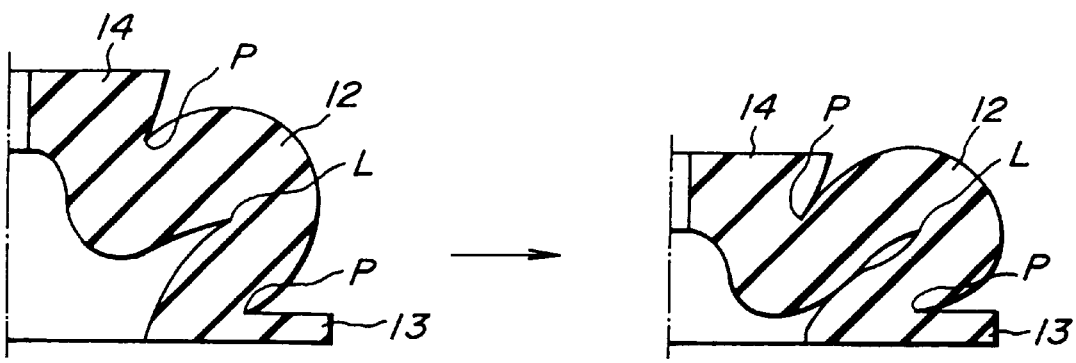
FIG_4
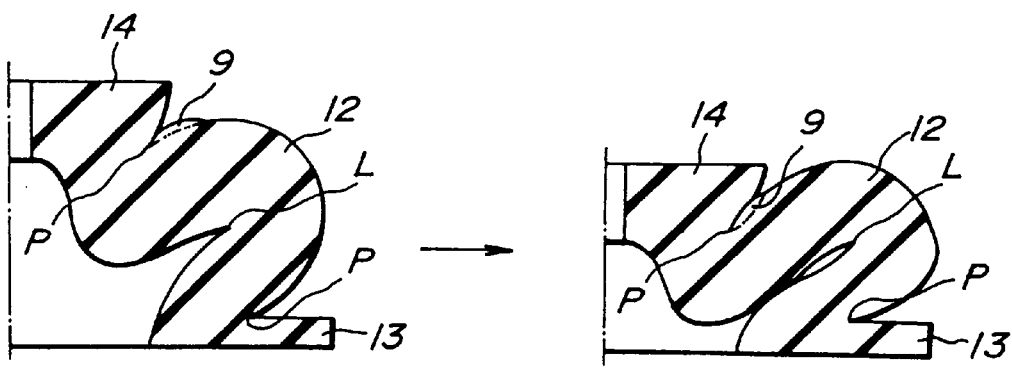

FIG_5
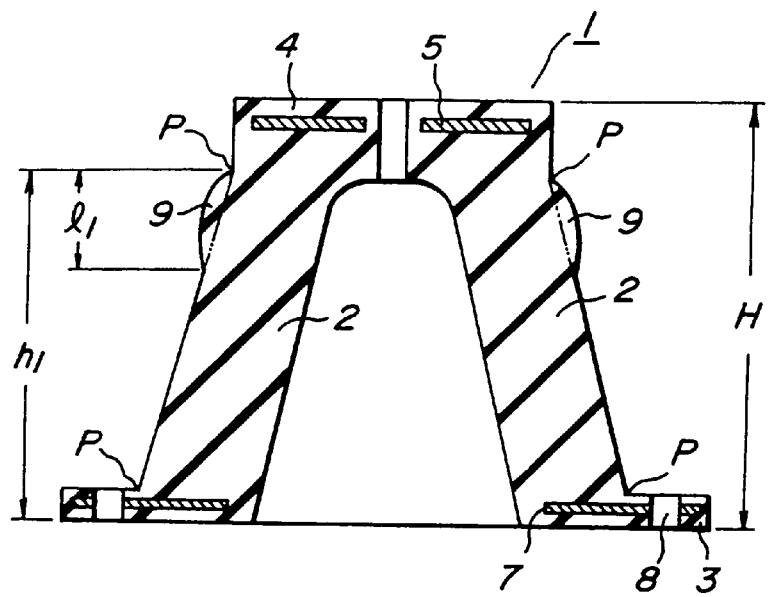
FIG_6
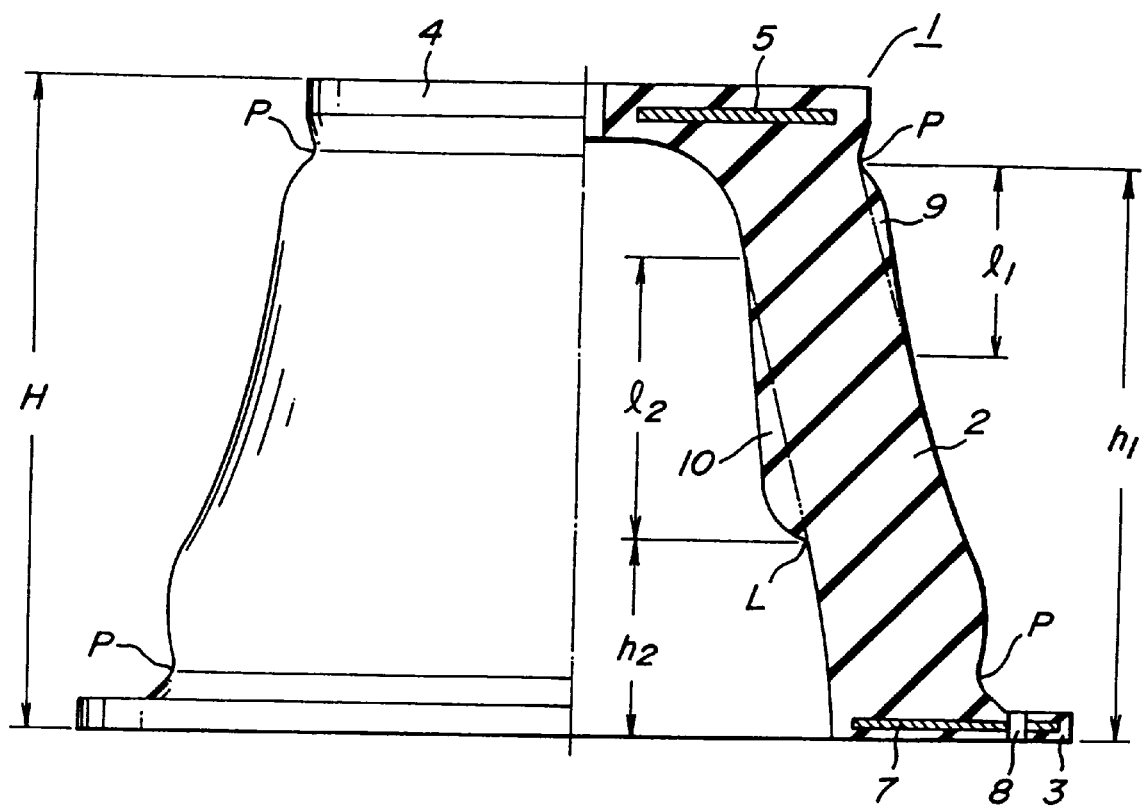

RUBBERY MARINE FENDERS

BACKGROUND OF THE INVENTION

1. Field of the Invention

This invention relates to a rubbery marine fender, and more particularly to an improvement of a rubbery buckling-type marine fender such as hollow cylindrical marine fender, V-shaped marine fender or the like absorbing energy in the berthing of a vessel and causing a buckling phenomenon during compression deformation.

2. Description of Related Art

There has hitherto been used a rubbery hollow cylindrical marine fender of a conical trapezoidal form as shown in FIG. 1. This marine fender comprises a main cylindrical rubber portion 12, a securing flange portion 13 for a quay wall, a shock receiving portion 14 and iron plates 15, 16 embedded in the portions 13, 14. When such a marine fender is compressed in its axial direction by berthing a vessel or the like thereto, there is obtained a deflection-reaction force curve absorbing a berthing energy as shown in FIG. 2. As seen from FIG. 2, after the reaction force increases with the increase of deflection to arrive at an upper peak (point A), it decreases to arrive at a point C though deflection increases, and again rapidly increases with further increase of deflection.

In the marine fender exhibiting such a characteristic curve, the actually usable range is a deflection range from the reaction force at the point A to a point B showing the reaction force equal to the point A, in which the absorption energy of the marine fender is represented by an area defined between the deflection-reaction force and an abscissa up to the point B. However, the reaction force is actually decreased to the point C, so that absorption energy is lost only by a portion S corresponding to an area surrounded with a dotted line A-B and a curve A-C-B.

SUMMARY OF THE INVENTION

It is, therefore, an object of the invention to provide a rubbery marine fender capable of reducing the aforementioned loss of the absorption energy (S) as far as possible. Concretely, the invention is to provide a rubbery marine fender capable of efficiently preventing the falling phenomenon of reaction force produced through the buckling deformation of the main rubber body portion in the marine fender by compression of a rubber buildup portion arranged adjacent or close to an outer buckling point of the main rubber body portion.

According to the invention, there is the provision of a rubbery marine fender comprising a main rubber body portion having substantially a frustoconical shape in its outer surface and inner surface, a shock receiving rubber portion formed on a base face of the main rubber body portion and a securing rubber flange portion extending from a bottom face of the main rubber body portion along a securing face thereof, in which a rubber buildup portion protruding outward from the outer surface of the main rubber body portion is arranged on the outer surface of the main rubber body portion at either or both regions adjacent or close to a buckling peripheral line thereof.

In a preferable embodiment of the invention, a rubber buildup portion protruding inward from the inner surface of the main rubber body portion is arranged on the inner surface of the main rubber body portion at a region adjacent or close to a buckling peripheral line thereof.

In another preferable embodiment of the invention, at least the outer surface of the main rubber body portion is a curved face of a diameter broadening toward the securing face.

In the other preferable embodiment of the invention, a disc-shaped or annular rigid plate is embedded in the shock receiving rubber portion and an annular rigid plate is embedded in the securing rubber portion. In this case, the buckling peripheral line is created on the outer surface of the main rubber body portion by the disc-shaped iron plate embedded in the shock receiving rubber portion.

As regards the buckling peripheral line on the outer surface of the main rubber body portion, it is favorable that a position $h_1$ from the securing rubber portion is $h_1=0.6H$ to $0.95H$ with respect to a height H of the marine fender and also a length $l_1$ of the rubber buildup portion is $l_1<0.5H$ with respect to the height H of the marine fender. On the other hand, a position $h_2$ of the buckling peripheral line on the inner surface of the main rubber body portion from the securing rubber portion is $h_2=0.2H$ to $0.6H$ and a length $l_2$ of the rubber buildup portion at this position is $l_2<0.75H$.

BRIEF DESCRIPTION OF THE DRAWINGS

FIG. 1 is a front view partly shown in section of the conventional cylindrical marine fender;

FIG. 2 is a diagram illustrating a deflection-reaction force curve of the conventional cylindrical marine fender;

FIG. 3 is a diagrammatically sectional view illustrating deformation behavior of the conventional cylindrical marine fender in the vicinity of buckling points;

FIG. 4 is a diagranmmatically sectional view illustrating deformation behavior of a cylindrical marine fender according to the invention;

FIG. 5 is a schematically section view of a first embodiment of the cylindrical marine fender according to the invention;

FIG. 6 is a front view partly shown in section of a second embodiment of the cylindrical marine fender according to the invention.

DESCRIPTION OF THE PREFERRED EMBODIMENTS

Figure 7:
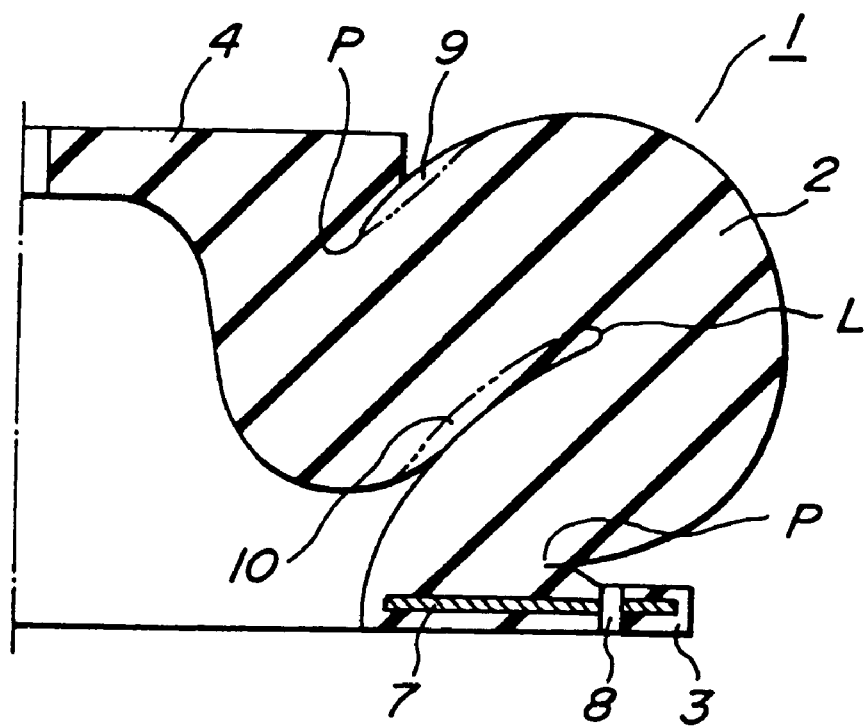
FIG. 7 is a schematically sectional view illustrating a buckling deformation state of the second embodiment according to the invention.

The invention is based on knowledge obtained by actually observing the compression deformation of the buckling-type rubbery cylindrical marine fender in detail.

In the conventional marine fender, as the deflection quantity increases from the point A to point B as shown in FIG. 2, the deformation proceeds from a left side toward a right side as shown by arrow in FIG. 3, during which the reaction force arrives at a peak (greatest point A) at once and largely falls down before the arrival to the point B. As seen from the deformation of the conventional marine fender in FIG. 3, the falling of the reaction force between the points A and B in FIG. 2 is caused in the course of the buckling deformation at the buckling peripheral line P on the outer surface of the main rubber body portion (or further with the buckling peripheral line L on the inner surface). That is, the upper and lower outer surfaces of the main rubber body portion do not contact with each other with respect to the buckling peripheral line P at the first and second steps of FIG. 3.

In the invention, therefore, a rubber buildup portion 9 is arranged on the outer surface of the main rubber body portion at either or both regions adjacent or close to a buckling peripheral line P thereof, whereby the contact compression zone is positively increased between the points A and B to increase the reaction force.

In the cylindrical marine fender according to the invention, as the compression deformation proceeds as shown by arrow in FIG. 4, the outer surface regions of the main rubber body portion sandwiching the buckling peripheral line P gradually contact with each other under compression to increase the contact compression zone, and hence compression reaction force can be produced at this zone to compensate the falling of reaction force between the points A and B.

In the rubbery marine fender according to the invention, the buckling peripheral line P is always held at a given position by the rubber buildup portion 9 formed on the outer surface of the main rubber body portion. On the contrary, the buckling peripheral line P is not frequently specified in the conventional marine fender, so that the position of the buckling peripheral line P scatters or each compression even in various products or the same product and hence the scattering of the reaction force is caused. In this connection, the formation of the rubber buildup portion 9 according to the invention solves this drawback of the conventional marine fender and reduces the scattering of reaction force.

Although the buckling peripheral line P is positively established by forming the rubber buildup portion 9 on the outer surface of the main rubber body portion in the marine fender according to the invention, the position of the buckling peripheral line P is separated apart from the position of the iron plate embedded in the securing rubber portion for quay wall, so that the concentration of stress in the embedded iron plate can be prevented to prevent peeling between rubber and iron plate and the rubber breakage to thereby improve the durability.

Moreover, the starting point of the rubber buildup portion 9 (or position of the buckling peripheral line P) differs in accordance with inclination angle of the main rubber body portion height of the shock receiving rubber portion and the like, but it is preferably within a range of $h_1=0.6H-0.95H$ in which $h_1$ is a position of the buckling peripheral line P and H is a height of the marine fender as measured from a base line thereof. Further, when a length $l_1$ of the rubber buildup portion is too long, it is difficult to take a great amount of displacement and the increase of reaction force is prematurely and undesirably caused, so that the length is usually within a range of $l_1<0.5H$. Also, the height of the rubber buildup portion 9 is properly selected in accordance with the size of the marine fender, the length of the rubber buildup portion, the thickness of the main rubber body portion and the like. On the other hand, when a rubber buildup portion is formed on the inner surface of the main rubber body portion at a position adjacent or close to the buckling peripheral line L, the position $h_2$ of the buckling peripheral line L from the securing rubber portion is $h_2=0.2H-0.6H$, and a length $l_2$ of the rubber buildup portion at this position is $l_2<0.75H$.

FIG. 5 illustrates a first embodiment of the rubbery cylindrical marine fender according to the invention. This marine fender 1 comprises a main rubber body portion 2 having a frustoconical shape in its outer surface and inner surface, a securing rubber flange portion 3 for fixing to a quay wall or the like, and a shock receiving rubber portion 4 protruding toward a vessel. To the shock receiving rubber portion 4 is fixed a shock receiving plate (not shown) directly supporting the berthing of the vessel. Further, an annular iron plate 5 is embedded in the shock receiving rubber portion 4 for the reinforcement thereof and internal thread (not shown) are formed therein for fixing the shock receiving plate. Moreover, an annular iron plate 7 is embedded in the securing rubber flange portion 3 for the reinforcement thereof and a bolt hole 8 is formed therein for fixing to the quay wall or the like through a bolt or anchor (not shown).

The buckling peripheral line P formed on the outer surface of the main rubber body portion 2 is a buckling part when a berthing load or the like is applied to the shock receiving plate. In the illustrated marine fender 1, when a height of the marine fender 1 is H, a position $h_1$ of the buckling peripheral line P is about 0.8H as measured from the securing rubber flange portion 3. The main rubber body portion 2 is largely bulged outward by starting from the buckling peripheral line P to cause buckling, whereby the berthing load is absorbed. Moreover, the buckling peripheral line P is created at two positions upward and downward.

In the marine fender 1, a rubber buildup portion 9 ($l_1=\frac{1}{3}H$) is formed on one-side region adjacent to the buckling peripheral line P. Therefore, when the marine fender 1 is deformed under compression by receiving the berthing load of the vessel to cause the bending deformation at the buckling peripheral line P, since the rubber buildup portion 9 is arranged, both faces of the main rubber body portion sandwiching the buckling peripheral line P contact with each other at positions which have never been contacted in the conventional marine fender as shown in FIG. 4 to cause an effective reaction force.

That is, the marine fender 1 according to the invention is reduced in the falling of the reaction force between the points A and B in the deflection-reaction force curve as shown in FIG. 2 because the reaction force changes in a substantially horizontal direction (broken lines), so that the increase of the reaction force can be attained.

Although the rubber buildup portion 9 is formed on one-side of the upper buckling peripheral line P in the illustrated embodiment, the rubber buildup portion may also be formed on a region(s) adjacent to the lower buckling peripheral line P. According to circumstances, rubber buildup portions 9 may be formed on both regions sandwiching each of these buckling peripheral lines P.

Since the buckling peripheral line P is formed inward from positions embedding the reinforcing iron plates 5, 7, the buckling peripheral line P acts together with the buckling peripheral line L formed on the inner surface of the main rubber body portion 2 to start the buckling of the marine fender 1 and develops the prevention of the peel or rubber breakage at the contact face between the embedded iron plate 5, 7 and rubber.

FIG. 6 illustrates a second embodiment of the cylindrical marine fender 1 according to the invention, in which numerals 1–9 and symbol P and the like have the same meanings as in the first embodiment. Since the buckling peripheral line L is also formed on the inner surface of the main rubber body portion 2, a rubber buildup portion 10 is formed on one-side adjacent to the buckling peripheral line L likewise the case of forming the rubber buildup portion 9. In this case, a position $h_2$ of the buckling peripheral line L is $\frac{1}{3}H$ and a length $l_2$ of the rubber buildup portion 10 is 0.5H.

In the marine fender of FIG. 6, there is created no space even to the buckling at each of the buckling peripheral lines P and L during the berthing as shown in FIG. 7 and both surfaces sandwiching each of these buckling peripheral lines contact with each other over substantially a full region, so that the area S shown in FIG. 2 becomes very small and the loss of the absorption energy is considerably prevented.

As mentioned above, according to the invention, the space in the vicinity of the buckling peripheral line P is positively removed by the rubber buildup portion in the buckling and hence there is caused no lowering of the reaction force in the deflection-reaction force curve, so that the invention provides a marine fender having improved absorption performance against berthing shock.

What is claimed is:

1. A rubbery marine fender comprising; a main rubber body portion having substantially a frustoconical shape in its outer surface and inner surface, a shock receiving rubber portion formed on a base face of the main rubber body portion and a securing rubber flange portion extending from a bottom face of the main rubber body portion along a securing face thereof, a rubber buildup portion protrudes outward from the outer surface of the main rubber body portion and is arranged on the outer surface of the main rubber body portion at least at a region substantially adjacent to a buckling peripheral line and located on the outer surface of said main rubber body portion at a position $h_1$ from the securing rubber portion, wherein $h_1=0.6H$ to $0.95H$ with respect to a height H of the marine fender and also said rubber buildup portion has a length of $l_1$ wherein, $l_1<0.5H$ with respect to the height H of the marine fender.

2. A rubbery marine fender according to claim 1, wherein a rubber buildup portion protruding inward from the inner surface of the main rubber body portion is arranged on the inner surface of the main rubber body portion at a region adjacent or close to a buckling peripheral line thereof.

3. A rubbery marine fender according to claim 2, wherein a position $h_2$ of the buckling peripheral line on the inner surface of the main rubber body portion from the securing rubber portion is $h_2=0.2H$ to $0.6H$ and a length $l_2$ of the rubber buildup portion at this position is $l_2<0.75H$.

4. A rubbery marine fender according to claim 1, wherein at least said outer surface of the main rubber body portion is a curved face of a diameter broadening toward the securing face.

5. A rubbery marine fender according to claim 1, wherein a disc-shaped or annular rigid plate is embedded in the shock receiving rubber portion and an annular rigid plate is embedded in the securing rubber portion.

6. A rubbery marine fender of claim 1, further comprising a second rubber buildup portion protruding outward from the outer surface of the main body portion at a second region substantially adjacent to said buckling line thereof.

\* \* \* \* \*